(12) United States Patent
Kreft et al.

(10) Patent No.: US 7,102,515 B2
(45) Date of Patent: Sep. 5, 2006

(54) SYSTEM FOR SECURING A KEY IN A VEHICLE

(75) Inventors: Thomas Kreft, New Baltimore, MI (US); Joseph Santavicca, Macomb, MI (US); John DiCroce, Oceanside, NY (US)

(73) Assignee: Audiovox Corporation, Hauppauge, NY (US)

( * ) Notice: Subject to any disclaimer, the term of this patent is extended or adjusted under 35 U.S.C. 154(b) by 180 days.

(21) Appl. No.: 10/920,996

(22) Filed: Aug. 18, 2004

(65) Prior Publication Data

US 2006/0038681 A1 Feb. 23, 2006

(51) Int. Cl.
*G08B 13/12* (2006.01)

(52) U.S. Cl. .................................. 340/568.2; 340/426.1; 340/687; 340/571

(58) Field of Classification Search ............. 340/568.2, 340/568.3, 568.4, 426.1, 432, 686.1, 686.4, 340/687, 571
See application file for complete search history.

(56) References Cited

U.S. PATENT DOCUMENTS

| | | | | |
|---|---|---|---|---|
| 3,695,067 | A | * 10/1972 | Bays | 70/63 |
| 4,546,345 | A | * 10/1985 | Naito | 340/542 |
| 6,262,664 | B1 | * 7/2001 | Maloney | 340/572.8 |

* cited by examiner

*Primary Examiner*—Jeffery Hofsass
*Assistant Examiner*—Hongmin Fan
(74) *Attorney, Agent, or Firm*—F. Chau & Associates, LLC

(57) ABSTRACT

A system for securing a key in a vehicle is provided. The system comprises: a cable for connecting to a vehicular component, wherein the cable comprises a first end and a second end; a lock for locking the first end of the cable and the second end of the cable; a key holder for holding a key, wherein the key holder comprises a connector for connecting to the cable; and an alarm system connector for connecting the cable to a vehicular alarm system.

28 Claims, 4 Drawing Sheets

SYSTEM FOR SECURING A KEY IN A VEHICLE

BACKGROUND OF THE INVENTION

1. Technical Field

The present invention relates to vehicle security, and more particularly, to a system for securing a key in a vehicle for use at an automobile dealership.

2. Discussion of the Related Art

Automobile dealerships typically have tens or hundreds of vehicles in inventory at any given time. Vehicles within the inventory are constantly being test driven by potential customers or relocated by dealership staff. In order to have a vehicle test driven or moved to another location at the dealership, a salesperson or another employee of the dealership must have access to the key for the vehicle they desire to move. This is typically accomplished by storing a set of keys in a secure location at the dealership. This, however, can be somewhat cumbersome, in that time is consumed when searching for the vehicle's key and logging the removal or return of the key. In addition, this process can lead to keys being misplaced or lost thus creating further time-consuming obstacles.

It is understood that a vehicle's key can simply be placed in the vehicle and then the vehicle can be locked using its pre-loaded security system. Although this may seem convenient, the failure to lock the vehicle after use, with an un-secured key therein is a vulnerability of such a system. This may occur, for example, when a shared controller for use with a pre-loaded security system accidentally disarms a vehicle's pre-loaded security system. Thus, a thief may gain unabated access to the vehicle. In addition, the knowledge that vehicles are in a dealership lot with unsecured keys therein may be too tempting for a potential thief to resist.

The shared controller, which is capable of controlling most of the pre-loaded security systems in a dealership lot, has yet another vulnerability in that it may be copied or stolen by a thief. Thus, enabling a thief with access to almost any vehicle on the dealership lot. Therefore, a need exists for a system for securing a key in a vehicle for use at an automobile dealership.

SUMMARY OF THE INVENTION

The present invention overcomes the foregoing and other problems encountered in the known teachings by providing a system for securing a key in a vehicle.

In one embodiment of the present invention, a system for securing a key in a vehicle, comprises: a cable for connecting to a vehicular component, wherein the cable comprises a first end and a second end; a lock for locking the first end of the cable and the second end of the cable; a key holder for holding a key, wherein the key holder comprises a connector for connecting to the cable; and an alarm system connector for connecting the cable to a vehicular alarm system.

The cable further comprises a sensor for sensing continuity of the cable. The sensor may be a sensing wire or a radio frequency (RF) sensor. The vehicular alarm system is triggered when discontinuity of the cable is sensed by the sensor. The lock is one of a barrel lock, a padlock, and a combination lock. A first portion of the lock is connected to the first end of the cable and a second portion of the lock is connected to the second end of the cable.

The key holder further comprises a sensor for triggering the vehicular alarm system. The sensor may be a switch or an RF transmitter. The alarm system connector triggers the vehicular alarm system when it is disengaged from one of the cable and the vehicular alarm system.

The system further comprises: a remote control device for transmitting one of an arming signal and a disarming signal to the vehicular alarm system, and an alarm controller for performing one of an arming and a disarming of a vehicular security system in response to the remote control device and for initiating an alarm indication in response to a triggering signal from one of the sensor, the cable, the key holder, and the alarm system connector.

In another embodiment of the present invention, a system for securing a key in a vehicle, comprises: a cable for attaching to a vehicular component, wherein the cable comprises a first end and a second end; a fastening means for fastening the first end of the cable and the second end of the cable, wherein the fastening means comprises a transmitter for transmitting a triggering signal to a vehicular security system; and a key for slidably attaching to the cable, where the key comprises an opening for passing the cable through the opening.

The cable further comprises a sensor for sensing continuity of the cable. When the sensor senses discontinuity in the cable the sensor transmits a signal to the transmitter, wherein upon receipt of the signal the transmitter transmits the triggering signal to the vehicle security system. The transmitter is an RF transmitter.

In yet another embodiment of the present invention, a system for securely providing a key in a vehicle, comprises: a housing comprising: a retractable cable for attaching to a vehicular component, wherein the retractable cable comprises an extendible end and a secure end; and a transmitter for transmitting a triggering signal to a vehicle security system; and a key holder for holding a key, wherein the key holder comprises an opening for slidably connecting to the cable.

The housing further comprises: a switch for performing one of releasing and retracting the retractable cable; and a securing portion for securing the extendible end of the cable to the housing. The system further comprises: a sensor for sensing motion within a vehicle, wherein when the sensor senses unauthorized motion in the vehicle, the sensor transmits the triggering signal to the vehicular security system.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
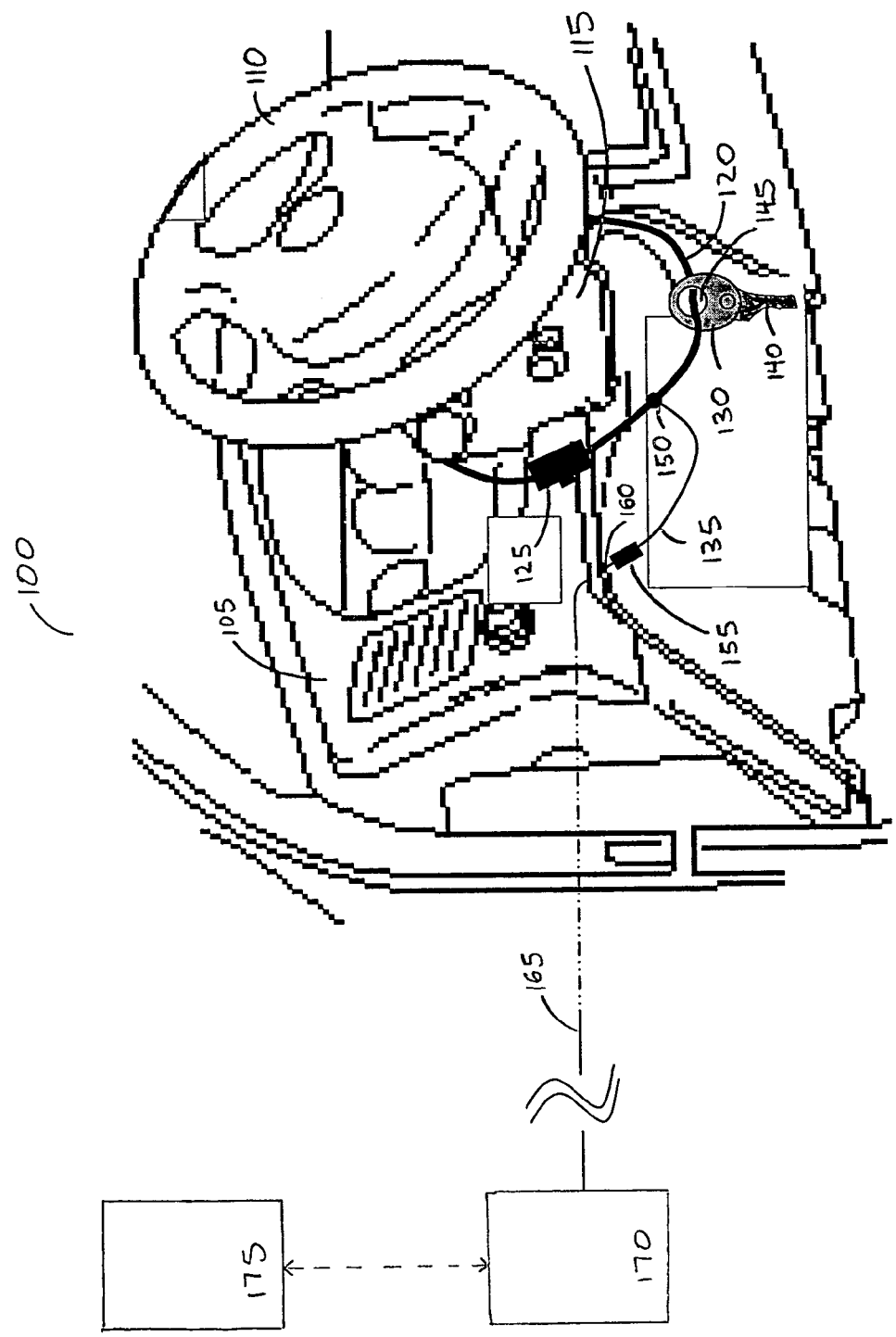
FIG. 1 illustrates a system for securing a key in a vehicle according to an exemplary embodiment of the present invention.

FIG. 1 illustrates a system for securing a key in a vehicle according to an exemplary embodiment of the present invention. As shown in FIG. 1, an inner compartment 100 of a vehicle includes, inter alia, a dashboard 105, a steering wheel 110, and a steering column 115. The system for securing a key in a vehicle includes a cable 120, a lock 125, a key holder 130, and an alarm system connector 135.

The cable 120 includes an inner conduit (not shown) that supports a sensing wire and/or sensing means (not shown) that may be connected to a vehicle's alarm system. The cable 120 is connected to the lock 125 at one and/or both of its ends. The lock 125 is used to secure both ends of the cable 120 so that the cable 120 may be secured around the steering column 115, the steering wheel 110, or any other suitable vehicular component. It is to be understood that the lock 125 may be a fastening device such as a barrel lock, a padlock, a combination lock, etc. It is to be further understood that the lock 125 can be opened by, for example, a master key.

The key holder 130 is used to hold a key 140 and includes an opening 145 for connecting the key holder 130 to the cable 120. The key holder 130 is connected to the cable 120 by placing an open end of the cable 120 through the opening 145, and the key holder 130 is secured to the cable 120 by locking both ends of the cable 120 together with the lock 125. It is to be understood that the key holder 130 is configured such that may enclose a portion of the key 140 such that if a thief were to gain access to the vehicle he could not utilize the key 140 to start the vehicle.

The alarm system connector 135 is connected to the cable 120 at one end via a snap-on and/or plug-in type connector 150, and a vehicle's alarm system at another end via a snap-on and/or plug-in type connector 155. The alarm system connector 135 is connected to the vehicle's alarm system at an alarm system interface 160, which provides a wired and/or wireless connection 165 to an alarm system controller 170.

As shown in FIG. 1, the cable 120 is connected to the steering column 115 of the vehicle and both of its ends are locked together by the lock 125. It is to be understood that the cable's 120 length is such that it cannot be removed (once secured to the steering column 115) by sliding it over the steering wheel 110. In addition, the cable's 120 length can be adjusted such that a thief could not maneuver the cable 120 when it secured to, for example, steering column 115 and insert the key 140 into the vehicle's ignition. The cable 120, which includes the vehicle's key 140 attached to the key holder 130, is connected to the vehicle's alarm system controller 170 via the alarm system connector 135. The vehicle's alarm system is armed, by transmitting, for example, an arming signal from a remote control device 175 to a radio frequency (RF) transceiver (not shown) of the vehicle's alarm system.

After arming the vehicle's alarm system, the vehicle is protected from potential thieves. Thus, for example, if a thief were to attempt to enter the vehicle without the proper access means, the vehicle's alarm system would sound a horn and/or flash lights of the vehicle in an effort to cause the thief to give up his attempt to rob the vehicle. This is accomplished when a vehicle security sensor (not shown) of the vehicle's alarm system senses the thief's action, sends a signal to the alarm controller 170, and the alarm controller 170 commands an alarm indicator (not shown) of the vehicle's alarm system to sound a horn and/or flash lights.

According to the present invention, employees of an automobile dealership possessing the means to disarm the vehicle's alarm system such as the remote control device 175 can disarm the vehicle's alarm system by transmitting a disarm signal to the vehicle. Once the vehicle's alarm system is disarmed, dealership personnel can enter the vehicle, unlock the lock 125, using for example, a master key, remove the key holder 130 and/or key 140 from the cable 120, and proceed to start the vehicle so they can take a customer for a test drive or to move the vehicle to another location in the lot, etc.

As further shown in FIG. 1, the remote control device 175 can be programmed to have a variety of modes and/or functions such as, a dealer mode and a consumer mode. The dealer mode may provide a passive arming function and a test drive function. The consumer mode may provide at least one of a remote security function, a keyless entry function, a security upgrade to the keyless entry function, a remote car start function, and a remote car start upgrade to the keyless entry function. The remote control device 175 can then be used to program the vehicle's alarm system to operate in the dealer mode and/or consumer mode by transmitting the appropriate signals to the alarm system controller 170.

For example, the remote control device 175 can program the alarm system controller 170 to employ the dealer mode. Thus, when the vehicle security system is in the dealer mode and the security system is disarmed, the alarm indicator will sound the vehicle's horn if the cable 120 is cut or the key 140 is disturbed or forcibly removed from the key holder 130 and/or the cable 120. Similarly, when the vehicle security system is in the dealer mode and the security system is disarmed, the alarm system controller 170 may also be programmed to sound the vehicle's horn if the cable 120 is cut or the key 140 is disturbed or forcibly removed from the key holder 130 and/or the cable 120.

Figure 2B:
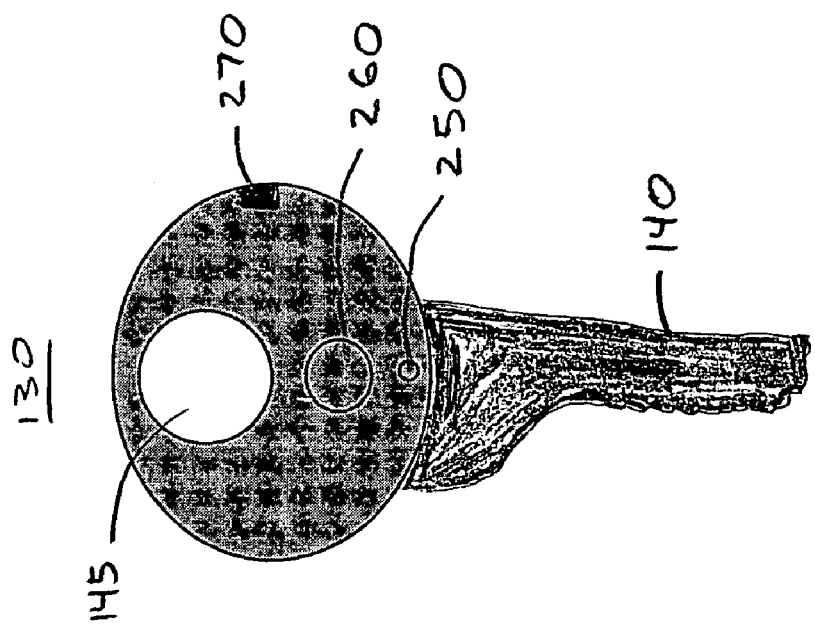
FIG. 2B illustrates the key holder of FIG. 1 in a closed position.
Figure 2A:
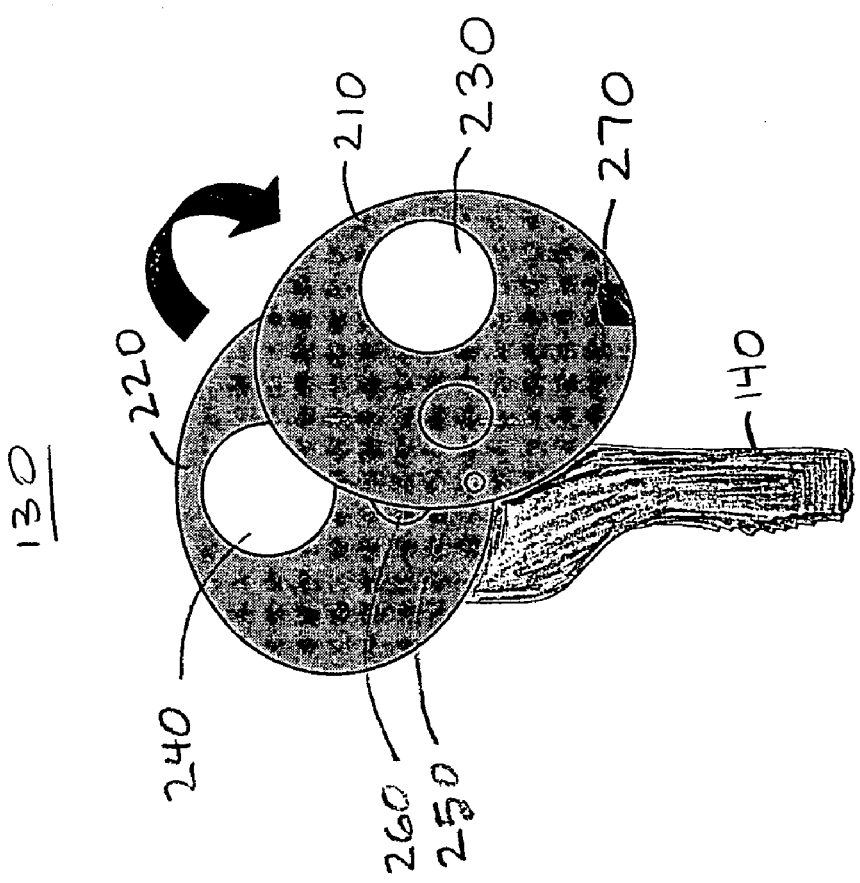
FIG. 2A illustrates a key holder of FIG. 1 in an open position.

FIG. 2A illustrates the key holder 130 of FIG. 1 in an open position. As shown in the FIG. 2A, the key holder 130 includes a top portion 210 and a bottom portion 220. The top portion 210 and the bottom portion 220 each include an opening 230, 240. The key holder 130 includes a swivel post 250 connected to the top portion 210 for allowing the top portion 210 and the bottom portion 220 to slide open and clasp the key 140. In addition, the swivel post 250 allows the openings 230, 240 to align with each other and thus form a single opening 145 (as shown in FIG. 2B) so that the key holder 130 can be connected to the cable 120. The key holder 130.further includes a key post 260 connected to the bottom portion 220 for allowing the key 140 to be connected thereto. The key holder 130 also includes a sensor 270 such as a contact tilt switch for transmitting a triggering signal to the vehicle's alarm system when, for example, the key 140 is disturbed or forcibly removed from the key holder 130 and/or the cable 120.

Figure 3:
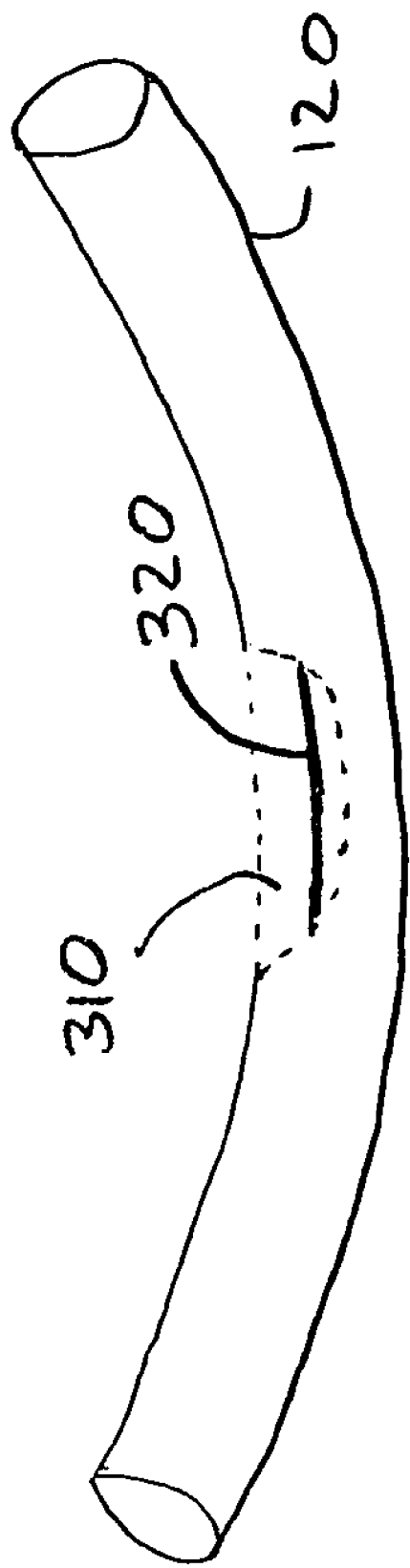
FIG. 3 illustrates an inner view of a cable of FIG. 1.

FIG. 3 illustrates an inner view of the cable 120 of FIG. 1. As shown in FIG. 3, the cable 120 includes an inner conduit 310 and a sensing wire 320. The sensing wire 320 is used to sense a continuity and a discontinuity of the cable 120. For example, if the cable 120 is cut by a thief, the sensing wire 320 will send a triggering signal (as it is cut) via the alarm system connector 135 to the vehicle's alarm system. The vehicle's alarm system will then sound a horn and/or flash lights of the vehicle in an attempt to ward off the thief.

Figure 4:
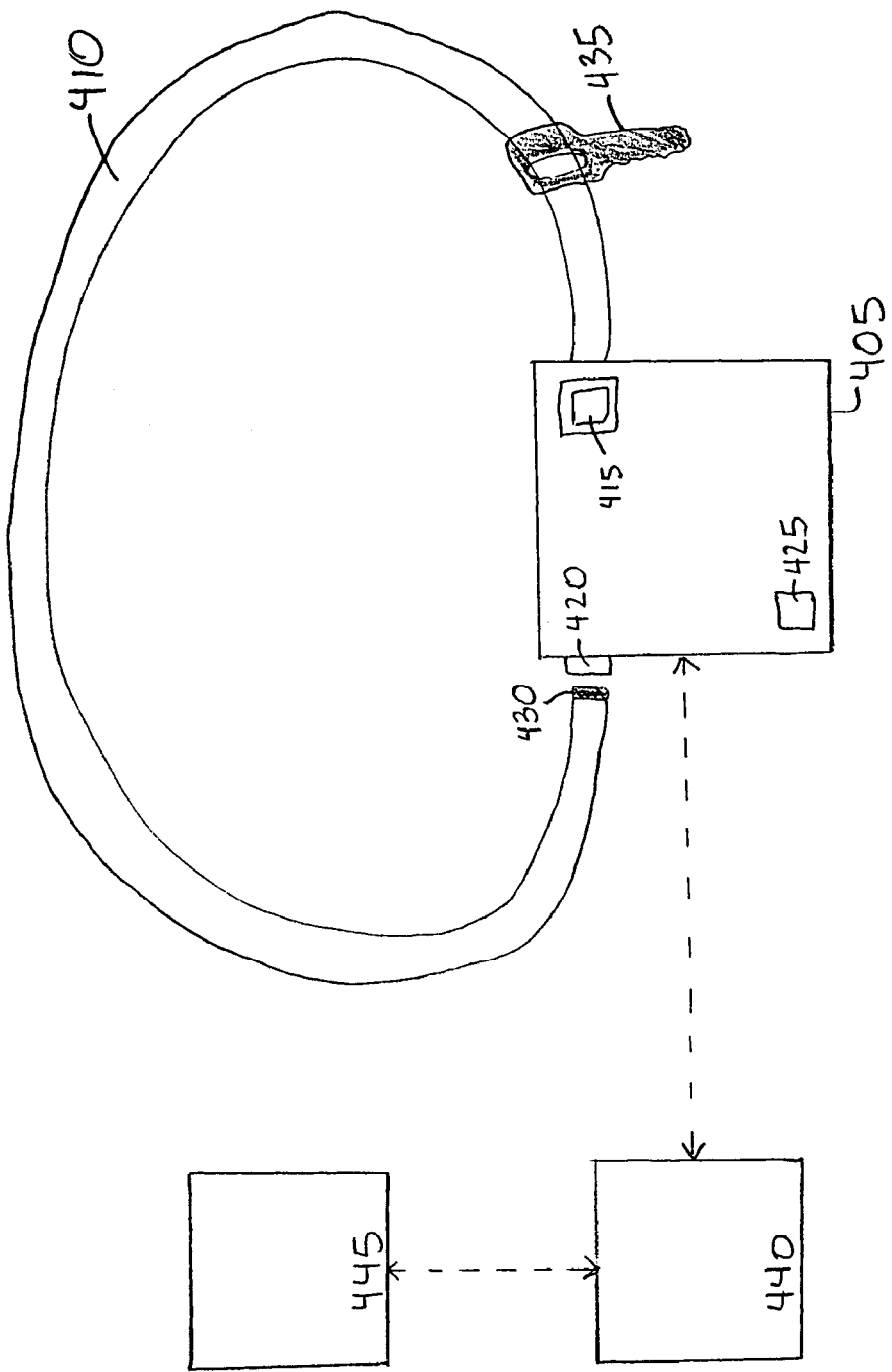
FIG. 4 illustrates a system for securing a key in a vehicle according to another exemplary embodiment of the present invention.

FIG. 4 illustrates a system for securing a key in a vehicle according to another exemplary embodiment of the present invention. As shown in FIG. 4, a housing 405 includes a cable 410, a button and/or slidable switch 415, and a lock 420. The cable 410 is a retractable cable capable of being adjusted to a desired length. The cable 410 may be removed from the housing 405 by depressing or sliding the button or slidable switch 415 and pulling the cable 410 from the housing 405 until a desired amount of cable 410 has been extended from the housing 405. The cable 410 is retracted back into the housing 405 similar to that of a retractable tape measure by again depressing or sliding the button or slidable switch 415.

Once extended from the housing 405, the cable 410 may be secured to or around a vehicular component such as a steering wheel, by inserting an extended end 430 of the cable 410 into the lock 420, thus securing the extended end 430 of cable 410 to the housing 405. Prior to inserting the extended end 430 of the cable 410 into the lock 420, a key 435 may be slidably connected to the cable 410.

As shown in FIG. 4, the housing 405 also includes a transmitter 425. The transmitter 425 may be, for example, a radio frequency (RF), infrared, etc., type transmitter capable of communicating with an alarm controller 440 of a vehicular alarm system and an external remote control device 445. Further, the transmitter 425 is capable of communicating with an internal sensor (e.g., as shown in FIG. 3) of the cable 410. Thus, for example, if the alarm controller 440 is armed and the cable 410 is tampered with and/or severed (as indicated by the cable's internal sensor or a motion sensor located in the vehicle) the transmitter 425 would then send a wireless signal to an RF receiver of the alarm controller 440 to initiate an alarm sequence.

In an alternative embodiment of the present invention, the key holder can be connected to and disconnected from the cable using a locking mechanism such as a locking hook and/or clamp connected to the key holder. In addition, a locking mechanism, for example, a padlock, can be attached to the cable allowing the key holder to be quickly connected or disconnected.

In another alternative embodiment of the present invention, the cable can include a non-removable alarm system connector. In yet another embodiment of the present invention, the cable can have looped ends for allowing a swivel arm of a conventional padlock to pass through the ends of the cable prior to locking the padlock. Further, the cable can be constructed to have a vinyl and/or a Teflon coating, etc. The cable can also be one of a filament, rope, strand, string, thread, wire, etc.

In another embodiment of the present invention, the cable can include an inner compartment for storing a motion sensor that can be used to send a triggering signal to the vehicle's alarm system if the cable is disturbed and/or severed. In yet another embodiment of the present invention, the lock or housing can also include a motion sensor capable of, for example, detecting unauthorized movement within the vehicle. The motion sensor can be, for example, a capacitive touch sensor, etc.

In another embodiment of the present invention, the RF transmitter and/or transceiver located in either the cable, lock, or housing can be utilized to transmit, for example, a status signal to a computerized security panel at a vehicle dealership. For example, the status signal could be related to the number of times the key has been removed from the cable or whether the key has been properly re-connected to the cable and the cable re-connected to a vehicular component after use. This can be accomplished by using an indicating means, such as an audible indicator, light emitting diode (LED), or an RF transmitter in the cable, lock or housing to provide an audible indication or a signal indicating the status of the vehicle. In addition, the dealership's security panel can be networked with a central monitoring cite to monitor the status of vehicles in the dealership lot that have the system of the present invention located therein.

In another alternative embodiment of the present invention, the RF transmitter and/or transceiver can be used to allow systems for securing a key in a vehicle to communicate with each other thus forming a network, which can be used, for example, to transmit data to the dealership's security panel and/or central monitoring cite.

It is to be understood that the system for securing a key according to the present invention can be connected to an exterior vehicular component such as a wheel and/or a door handle, etc. It is to be further understood that the system for securing a key according to the present invention can be connected to an interior vehicular component such as an inner door handle, a connecting means in a glove, door and/or overhead storage compartment, and a connecting means located in a center console.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A system for securing a key in a vehicle, comprising:
   a cable for securing to a vehicular component, wherein the cable comprises a first end and a second end;
   a lock for locking the first end of the cable and the second end of the cable;
   a key holder for holding a key, wherein the key holder comprises a connector for connecting to the cable; and
   an alarm system connector for connecting the cable to a vehicular alarm system,
   wherein the cable further comprises a sensor for sensing continuity of the cable.

2. The system of claim 1, wherein the sensor is a sensing wire.

3. The system of claim 1, wherein the sensor is a radio frequency (RF) sensor.

4. The system of claim 1, wherein the vehicular alarm system is triggered when discontinuity of the cable is sensed by the sensor.

5. The system of claim 1, wherein the lock is one of a barrel lock, a padlock, and a combination lock.

6. The system of claim 1, wherein a first portion of the lock is connected to the first end of the cable and a second portion of the lock is connected to the second end of the cable.

7. The system of claim 1, wherein the key holder further comprises:
a sensor for triggering the vehicular alarm system.

8. The system of claim 7, wherein the sensor is a switch.

9. The system of claim 7, wherein the sensor is an RF transmitter.

10. The system of claim 1, wherein the alarm system connector triggers the vehicular alarm system when it is disengaged from one of the cable and the vehicular alarm system.

11. The system of claim 1, further comprising:
a remote control device for transmitting one of an arming signal and a disarming signal to the vehicular alarm system.

12. The system of claim 1, further comprising:
an alarm controller for performing one of an arming and a disarming of a vehicular security system in response to a remote control device and for initiating an alarm indication in response to a triggering signal from one of the cable, the key holder, the lock and the alarm system connector.

13. A system for securing a key in a vehicle, comprising:
a cable for securing to a vehicular component, wherein the cable comprises a first end and a second end;
a fastening means for fastening the first end of the cable and the second end of the cable, wherein the fastening means comprises a transmitter for transmitting a triggering signal to a vehicular security system; and
a key for slidably attaching to the cable, where the key comprises an opening for passing the cable through the opening,
wherein the triggering signal is transmitted to the vehicular security system when the cable is disturbed or the key is disturbed.

14. The system of claim 13, wherein the cable further comprises:
a sensor for sensing continuity of the cable.

15. The system of claim 14, wherein when the sensor senses discontinuity in the cable, the sensor transmits a signal to the transmitter, wherein upon receipt of the signal the transmitter transmits the triggering signal to the vehicle security system.

16. The system of claim 13, wherein the transmitter is a radio frequency (RF) transmitter.

17. A system for securely providing a key in a vehicle, comprising:
a housing comprising:
a retractable cable for securing to a vehicular component, wherein the retractable cable comprises an extendible end and a secure end; and
a transmitter for transmitting a triggering signal to a vehicle security system; and
a key holder for holding a key, wherein the key holder comprises an opening for slidably connecting to the cable,
wherein the cable further comprises a sensor for sensing continuity of the cable.

18. The system of claim 17, wherein the housing further comprises:
a switch for performing one of releasing and retracting the retractable cable; and
a securing portion for securing the extendible end of the cable to the housing.

19. The system of claim 17, wherein the system further comprises:
a sensor for sensing motion within a vehicle, wherein when the sensor senses unauthorized motion in the vehicle, the triggering signal is transmitted to the vehicle security system.

20. The system of claim 17, wherein when a continuity condition of the cable is sensed, the triggering signal is transmitted to the vehicle security system.

21. A system for securing a key in a vehicle, comprising:
a cable for securing to a vehicular component, wherein the cable comprises a first end and a second end;
a lock for locking the first end of the cable and the second end of the cable;
a key holder for holding a key, wherein the key holder comprises a connector for connecting to the cable; and
an alarm system connector for connecting the cable to a vehicular alarm system,
wherein the key holder further comprises a sensor for triggering the vehicular alarm system.

22. The system of claim 21, wherein the key holder further comprises a transmitter.

23. The system of claim 21, wherein the sensor is a switch.

24. The system of claim 21, wherein the sensor is a motion sensor.

25. A system for securing a key in a vehicle, comprising:
a cable for securing to a vehicular component, wherein the cable comprises a first end and a second end;
a locking device for locking the first end of the cable and the second end of the cable;
a key holder for holding a key, wherein the key holder comprises a connector for connecting to the cable; and
an alarm system connector for connecting the cable to a vehicular alarm system,
wherein the locking device further comprises a sensor for triggering the vehicular alarm system.

26. The system of claim 13, wherein the key further comprises:
a sensor for triggering the vehicular alarm system.

27. The system of claim 26, wherein the sensor is a switch.

28. The system of claim 27, wherein the sensor is an RF transmitter.

* * * * *